Figure 1:
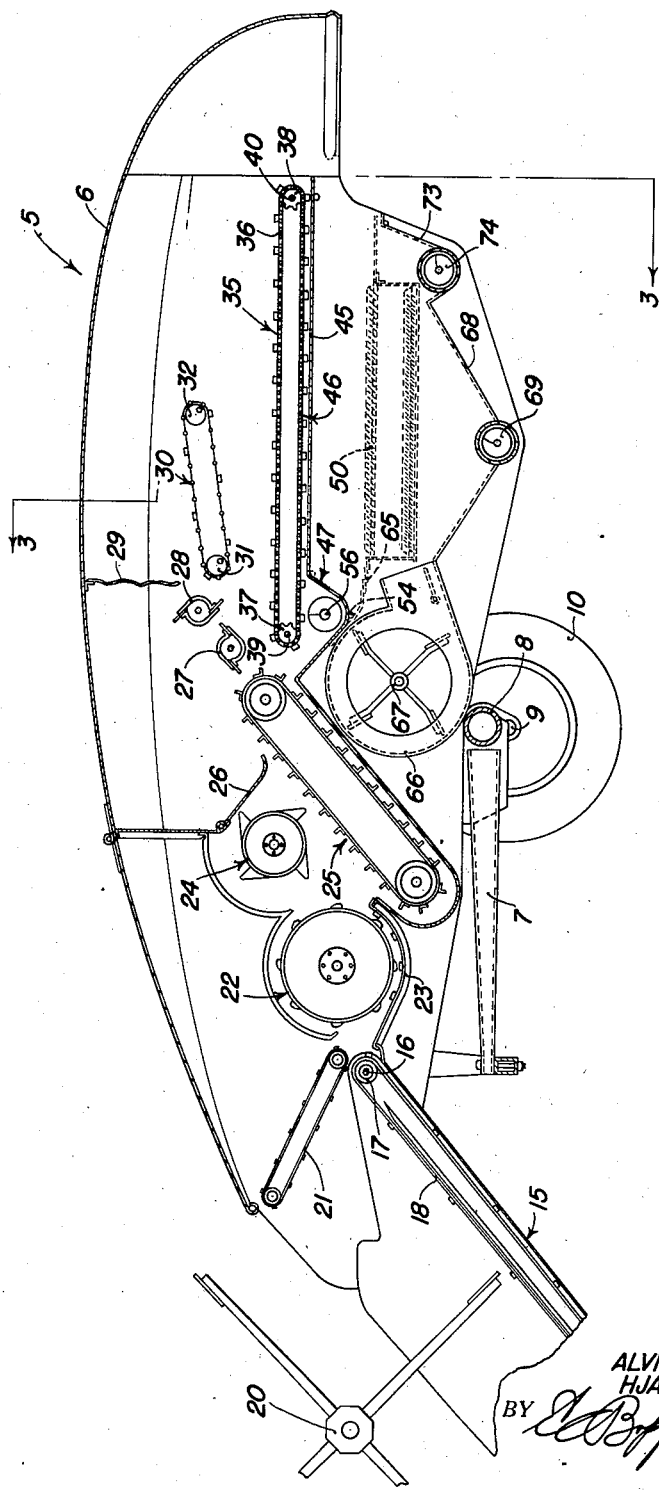

Aug. 11, 1942.   A. W. OEHLER ET AL   2,292,650
COMBINE
Filed Jan. 29, 1940   3 Sheets-Sheet 3

INVENTOR:
ALVIN W. OEHLER &
HJALMAR C. THOMPSON
BY
ATTORNEYS.

Patented Aug. 11, 1942

2,292,650

UNITED STATES PATENT OFFICE 2,292,650

COMBINE

Alvin W. Oehler and Hjalmar C. Thompson, Moline, Ill., assignors to Deere & Company, Moline, Ill., a corporation of Illinois Application January 29, 1940, Serial No. 316,120

7 Claims. (Cl. 130—27)

The present invention relates generally to grain separating and cleaning mechanism, and more particularly to mechanism of this kind as applied to harvester threshers of the so-called straight through type, in which the harvester platform extends forwardly and is inclined downwardly from the threshing cylinder to the cutter bar at the lower forward end thereof, the latter being approximately coextensive with the cylinder. In this type of machine the threshed grain and straw travel in a straight line rearwardly through the separating and cleaning mechanism, and the straw is discharged in a layer from the rear of the combine. No straw spreading mechanism is required inasmuch as the straw rack is also the same width as the cylinder and cutter bar.

A wide straw rack provides for good efficiency since it permits the straw to be distributed loosely in a thin layer over a large surface and thus releases the kernels of grain more readily. However, the width of the separating shoe, for maximum efficiency, is limited by the length of the fan, the dimensions of which are comparatively inflexible for a given capacity. A long fan of small diameter does not deliver an air blast of uniform flow throughout its length, inasmuch as the intake air does not readily travel to the center of the fan, therefore the grain cleaning shoe is usually made narrower than the straw separator in order to obtain maximum efficiency and is positioned underneath the straw separator in this type of combine. In those combines having a width of six feet or less, which are the sizes most common in the present day market, the sides of the thresher housing are inclined downwardly and inwardly from the straw separator to the cleaning shoe and serve to direct the grain and chaff falling from the separator into the cleaning shoe in a satisfactory manner. This expedient is not as satisfactory, however, in the case of straight through combines having a width of eight feet or more, for the reason that the slope of the inclined sides is not sufficient to allow the grain and chaff to slide into the grain cleaner unless the separator is positioned at a much greater height above the cleaning shoe. Since the greater height would entail other difficulties, it is the principal object of the present invention to provide new and improved means for gathering grain and chaff from a wide straw separator and distributing the same upon a comparatively narrow cleaning shoe.

In the accomplishment of this object a conveyor is provided for sweeping the grain and chaff which falls through the straw separator into a transverse trough in which means are provided for moving the grain and chaff from opposite ends of the trough toward the center thereof to a discharge opening communicating with the cleaning shoe.

Figure 2:
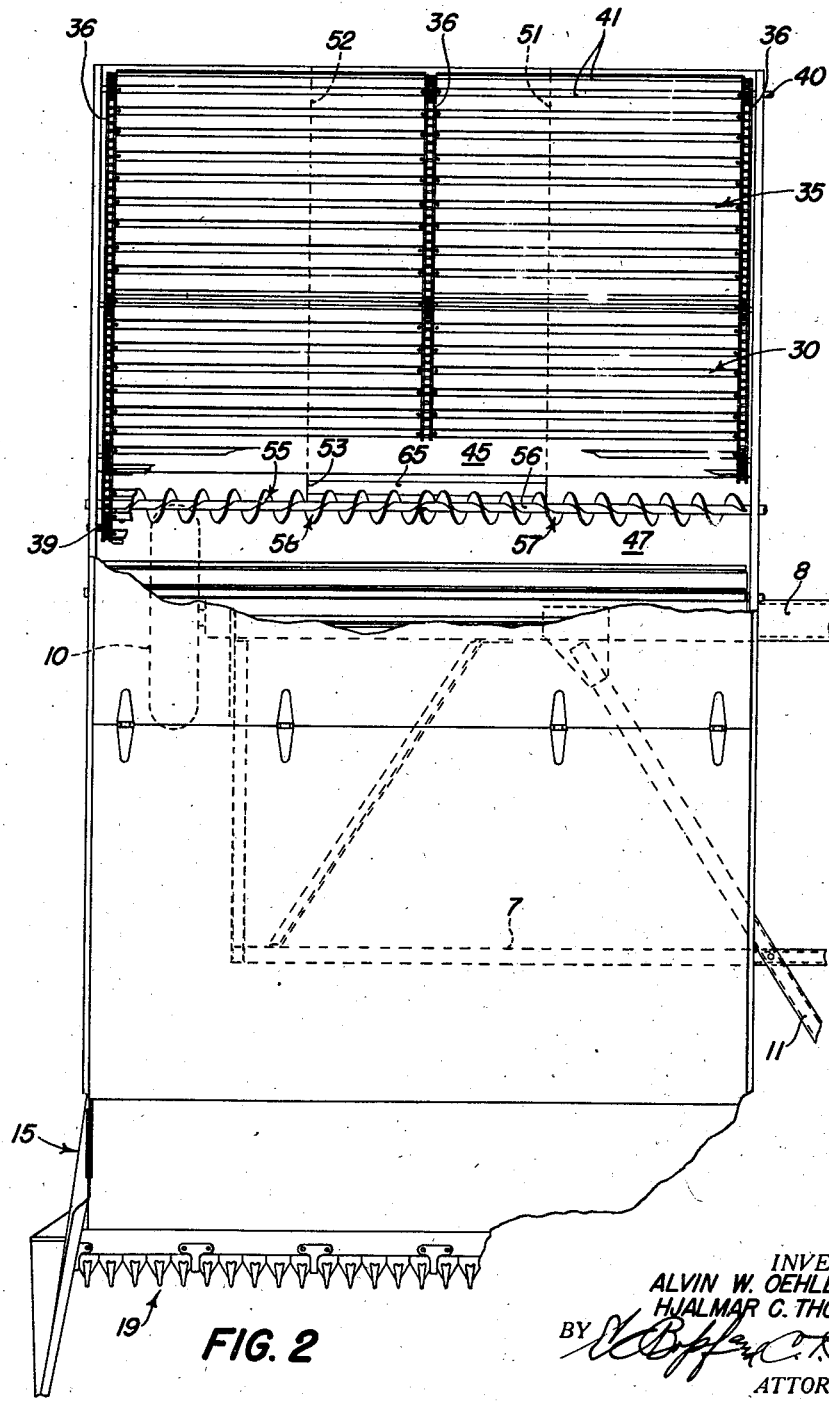
Figure 3:
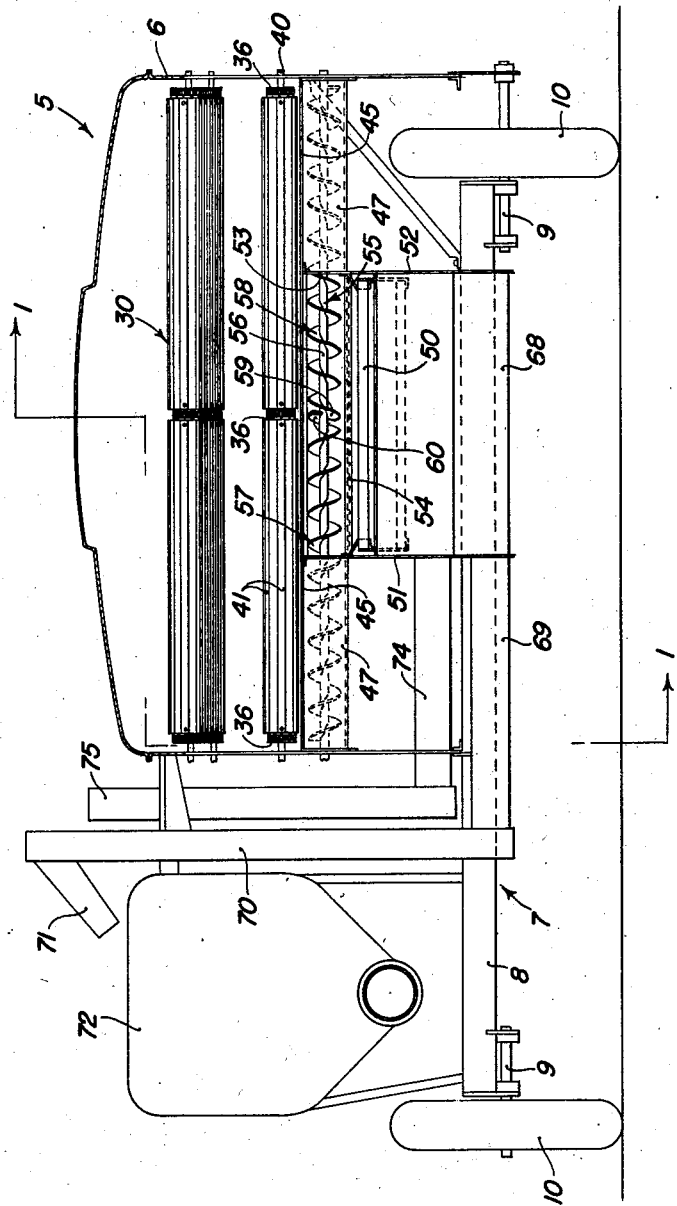

One embodiment of the present invention will now be described, reference being had to the drawings appended hereto, in which Figure 1 is a side elevation of the threshing and separating equipment taken in section along a line 1—1 in Figure 3;

Figure 2 is a plan view of the separator housing of the combine shown in Figure 1, the rear portion of the roof being broken away to show the details of construction therein; and Figure 3 is a rear view of the combine taken in section along a line 3—3 in Figure 1.

Referring now to the drawings, the combine comprises a threshing and separating unit 5 having a sheet metal housing 6 supported on a frame 7 which includes a transversely extending axle beam 8. At each end of the axle beam 8 is fixed a stub axle 9 on which is journaled a ground wheel 10. A conventional draft frame is connected to the axle beam 8, a portion 11 of which is shown in Figure 2. The draft frame extends forwardly and is connected to a tractor and inasmuch as this type of frame is well known to those skilled in the art, this member is not shown completely in detail.

Harvested grain is fed into the forward end of the housing 6 by means of a harvester platform 15 pivoted to the housing 6 on a transversely extending shaft 16 on which is also supported the upper roller 17 of the canvas conveyor 18. A conventional cutter bar 19 is mounted transversely along the forward edge of the platform 15 and a reel 20 is carried on the platform 15 in the usual manner.

Mounted in the forward opening of the housing 6 is a conventional upper canvas 21 for crowding harvested crops into the threshing cylinder 22 which cooperates with the concaves 23 to thresh the grain from the straw. A rotatable beater 24 is disposed behind the threshing cylinder 22 and cooperates with a raddle 25 to carry the straw and threshed grain away from the cylinder.

The straw and grain are carried by the raddle 25 past a swinging baffle 26 into the separator portion of the housing 6. A pair of rotary beaters 27, 28 agitates and passes the straw past a baffle curtain 29 hanging from the roof of the housing 6 to a raddle chain 30 which is trained around a pair of eccentrically mounted rollers 31, 32 which impart to the raddle chain 30 an oscillating movement for agitating the straw.

The grain and chaff which is shaken out of the straw by the agitating mechanism described above, falls upon a straw rack 35 comprising three drive chains 36 disposed along opposite sides of the housing and down the center thereof and trained around a pair of rollers 37, 38 which are rotatably supported on shafts 39, 40, respectively, journaled in the side sheets of the housing 6. A plurality of transversely extending slats 41 are supported on the chains 36 and are spaced apart to provide openings for grain and chaff to fall through the conveyor. A solid floor 45 is disposed under the straw rack and serves to catch the grain and chaff that fall through the rack. The lower run or lap 46 of the conveyor 35 sweeps forwardly across the floor 45 and carries with it the grain and chaff which is discharged into a trough 47 which extends transversely under the forward end of the conveyor 35, from one side of the separator housing to the other coextensive with the width of the straw rack.

A grain cleaner 50 is disposed beneath the straw rack and generally parallel thereto, and comprises the usual sieves or screens which are reciprocated by conventional mechanism (not shown). The grain cleaner 50 is considerably narrower than the straw rack 35 and is disposed in a lower housing, the walls 51, 52 of which are spaced inwardly from the side walls of the housing 6. Although in the preferred embodiment shown and described herein, the grain cleaner housing is disposed with its center line coincident with the center line of the main housing 6, it is within the scope of the present invention to locate the grain cleaner in offset relation with respect to the center line of the housing 6.

The trough 47 has an opening 53 along its rear side, preferably coincidental with the width of the cleaning shoe 50, the opening 53 extending downwardly to the bottom of the trough 47 and the edge of the trough along the lower side of the opening 53 is curled as at 54 (see Figure 1) to obtain a smooth edge along the opening.

The grain and chaff which is swept into the trough 47 by the lower lap 46 of the straw conveyor 35, is moved from the opposite ends of the trough 47 to the opening 53 by means of an auger conveyor 55 comprising a shaft 56 journaled in the opposite side walls of the housing 6 on which is disposed a pair of oppositely wound helical plates 57, 58, respectively. In operation, the auger 55 is rotated in such a direction as to move the grain and chaff toward the opening 53, at which point it is discharged through the opening onto the cleaning shoe 50. It will be noted that the inner ends 59, 60 of the two oppositely wound flights 57, 58, respectively, overlap at the center of the shaft. That is to say, each of the flights 57, 58 is continued past the center of the shaft a portion of a turn, but terminate before they intersect with the opposite flight. We have found by experience that when the inner ends of the two flights are terminated in several other different arrangements, there is a tendency for the straw to wrap around the conveyor shaft 56 and cause clogging of the conveyor, but this difficulty has been overcome by the overlapping arrangement of flights shown in the drawings appended hereto.

The grain and chaff discharges through the opening 53 in the trough onto a stepped grain pan 65 fixed to one end of the cleaning shoe 50 and reciprocable therewith. Reciprocating movement of the pan 65 urges the grain and chaff downwardly upon the shoe. The pan 65 extends forwardly under the trough and slides between the latter and the housing 66 of the cleaning fan 67 and thus provides a seal which prevents grain from escaping over the forward end of the pan 65.

The grain drops through the screens of the cleaning shoe while the chaff and dust are blown rearwardly by the blast from the blower 67 and out through the rear end of the housing. The clean grain falls into the grain trough 68 which is fixed to the side walls 51, 52 of the cleaning shoe housing. An auger conveyor 69 at the bottom of the grain trough 68 conveys the grain laterally to the grain elevator 70 which conveys the grain upwardly and discharges it through a spout 71 into the grain storage tank 72. The tailings pass over the cleaning shoe 50 and are caught by the tailings trough 73 at the rear end of the shoe from which they are conveyed by a second auger 74 to the tailings elevator 75 which delivers them to the cylinder for rethreshing in the usual manner.

We do not intend our invention to be limited to the specific details of construction shown and described herein except as limited by the claims which follow.

We claim:

1. In a device of the class described, means for separating straw from grain and chaff, a grain cleaning shoe disposed under said straw separating means and having a width appreciably less than that of said separator, a trough for receiving grain and chaff from said separator, said trough extending transversely of said separating means and having a discharge opening substantially coextensive with the width of said cleaning shoe for discharging said grain and chaff thereto, and a conveyor movable in said trough for moving said grain and chaff to said opening.

2. In a device of the class described, means for separating straw from grain and chaff, a grain cleaning shoe disposed under said straw separating means and generally parallel thereto, the sides of said shoe being spaced inwardly from the sides of said separator, a trough for receiving grain and chaff from said separator, said trough extending transversely of said separating means and having a discharge opening substantially coextensive with the width of said cleaning shoe for discharging said grain and chaff thereto, and means in said trough for moving said grain and chaff from opposite ends of said trough to said opening.

3. A grain separator and cleaner comprising means for separating straw from grain and chaff and including conveying means for moving said grain and chaff to one end of said separating means, a transversely extending trough disposed at said end of the separating means for receiving said grain and chaff, a grain cleaning shoe disposed under said straw separator and appreciably narrower than the latter, the sides of said shoe being spaced inwardly from the sides of said separator, there being a discharge opening in said trough for delivering said grain and chaff to said shoe, and means in said trough for moving said grain and chaff from opposite ends of the trough to said discharge opening.

4. The combination set forth in claim 3, wherein the means for moving grain and chaff in said trough comprises an auger conveyor having oppositely wound flights at opposite ends thereof, respectively.

5. The combination set forth in claim 3, wherein the means for moving grain and chaff in said trough comprises an auger conveyor having oppositely wound flights mounted on a common shaft and extending from opposite ends thereof, respectively, the inner ends of said flights overlapping each other.

6. A device of the class described comprising, in combination, a straw separator including an endless flexible conveyor upon which straw is delivered and discharged thereby at one end thereof, said conveyor being apertured to allow grain and chaff to fall therethrough, a floor under the lower lap of the conveyor over which the latter moves to sweep said grain and chaff to the other end of said conveyor, a trough extending transversely under said other end of the conveyor for receiving said grain and chaff and having a discharge opening extending along a portion thereof intermediate its ends, a grain cleaning shoe having a width appreciably less than that of said separator and disposed to receive said grain and chaff from the discharge opening of said trough, and an auger conveyor disposed in the trough and adapted to move grain and chaff from both ends thereof to said discharge opening.

7. The combination set forth in claim 6 in which the auger conveyor comprises a shaft having a pair of oppositely wound helical flights extending inwardly from opposite ends thereof, the inner ends of said flights being disposed in overlapping relation to each other.

ALVIN W. OEHLER.
HJALMAR C. THOMPSON.